United States Patent [19]

Suman et al.

[11] Patent Number: 4,529,157

[45] Date of Patent: Jul. 16, 1985

[54] VISOR PIVOT MOUNT

[75] Inventors: Michael J. Suman, Holland; Russell L. Clark, Zeeland, both of Mich.

[73] Assignee: Prince Corporation, Holland, Mich.

[21] Appl. No.: 515,214

[22] Filed: Jul. 20, 1983

[51] Int. Cl.³ ............................................. E04G 3/00
[52] U.S. Cl. ................................ 248/289.1; 248/278; 296/97 K
[58] Field of Search ................ 248/289.1, 278, 282, 248/285, 287, 288.1, 296; 296/97 K; 403/197, 194

[56] References Cited

U.S. PATENT DOCUMENTS

| | | |
|---|---|---|
| 342,194 | 5/1886 | Finnegan et al. |
| 496,792 | 5/1893 | Peeples |
| 2,084,584 | 6/1937 | Jacobs |
| 2,110,120 | 3/1938 | Ball |
| 2,357,974 | 9/1944 | Roberts |
| 2,939,741 | 6/1960 | Keating et al. ............... 248/289.1 |
| 3,096,106 | 7/1963 | Wanner ............................ 403/197 |
| 3,150,896 | 9/1964 | Plattner ......................... 248/289.1 |
| 3,322,388 | 5/1967 | Budreck ........................ 248/289.1 |
| 3,399,923 | 9/1968 | Bornefeld et al. |
| 3,477,678 | 11/1969 | Icke et al. |
| 3,767,256 | 10/1973 | Sarkees ......................... 248/289.1 |
| 4,023,856 | 5/1977 | De Rees ............................ 248/278 |
| 4,148,519 | 4/1979 | Hollar ........................... 248/289.1 |
| 4,178,035 | 12/1979 | Cziptschirsch |
| 4,223,861 | 9/1980 | Guggemos et al. |
| 4,352,518 | 10/1982 | Prince et al. ..................... 296/97 H |
| 4,369,996 | 1/1983 | Fluck ............................. 248/289.1 |
| 4,377,020 | 3/1983 | Vigo |

FOREIGN PATENT DOCUMENTS 2341940 11/1977 Fed. Rep. of Germany .
1251479 10/1971 United Kingdom .

*Primary Examiner*—William H. Schultz
*Assistant Examiner*—Ramon O. Ramirez
*Attorney, Agent, or Firm*—Price, Heneveld, Huizenga & Cooper

[57] ABSTRACT

A visor mounting structure includes a visor rod having a locking member secured to the rod to provide a predetermined rotational torque between the rod and the locking member. The locking member includes tabs extending outwardly for engaging one side of the sheet metal roof of a vehicle when installed. The assembly also includes a cover plate extending over the visor rod and axially spaced from the locking member and including tabs engaging an opposite side of the roof. When the locking member is inserted in the sheet metal roof and rotated to an engaging position, the cover plate is secured thereto to compressibly clamp the assembly in position in the vehicle, thereby mounting the visor attached to the visor rod to the vehicle.

23 Claims, 12 Drawing Figures

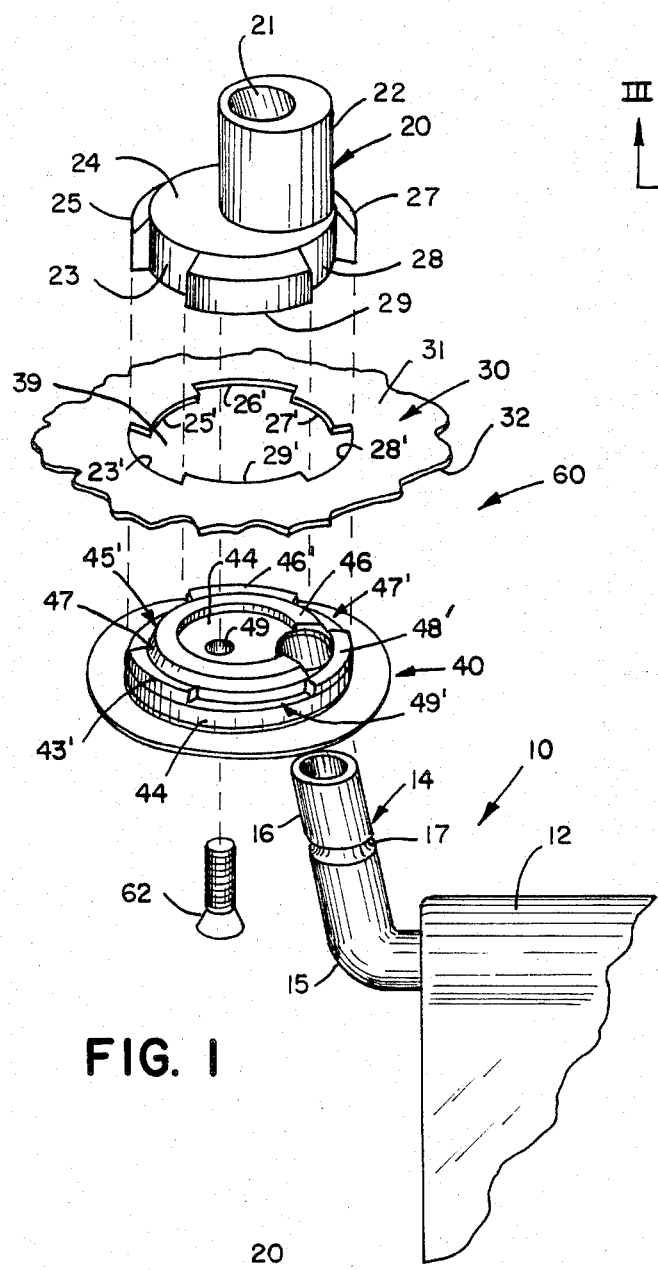
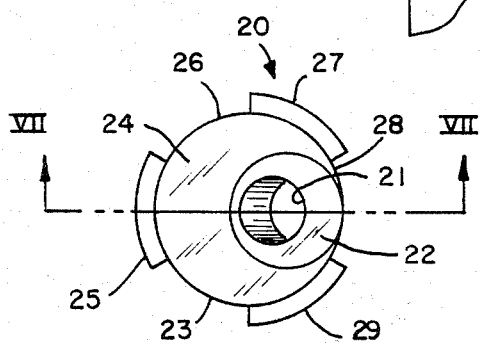
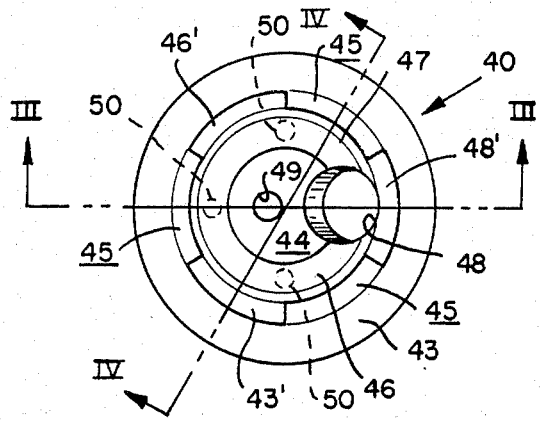
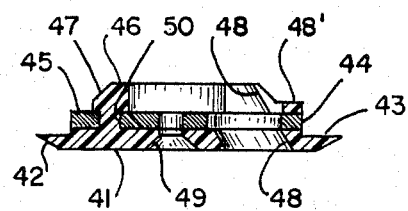
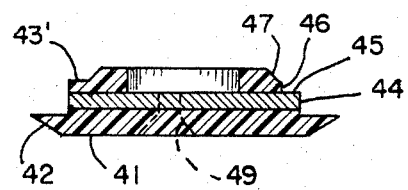

VISOR PIVOT MOUNT

BACKGROUND OF THE INVENTION

The present invention pertains to vehicle sun visors and particularly to a mounting system for installing a visor in a vehicle.

Vehicle visors are typically mounted in the headliner of a vehicle to the underlying sheet metal roof by an elbow bracket which permits the visor to be moved from a forward windshield position to a side window depending upon driving conditions. The elbow assembly is mounted to the vehicle roof usually by three screws, and U.S. Pat. No. 4,075,468 illustrates such a mounting system as currently, commonly used in the automotive industry.

There have been several proposals for providing snap-in visor mounts which are illustrated in U.S. Pat. Nos. 2,357,974; 4,178,035; and 4,377,020. These proposed visor mounts can generally be classified as snap-in devices. Great Britain Pat. No. 1,251,479 also discloses a visor mounting structure in which a socket is secured within an aperture of the vehicle roof, and a plug with tabs is inserted and lockably held within the socket through L-shaped slots and a compression spring mounting arrangement.

SUMMARY OF THE PRESENT INVENTION

The mounting system of the present invention provides a bayonet-type structure in which a locking member is integrally molded to the visor rod end to provide a torque fitting and which is readily insertable into an aperture in the vehicle roof and subsequently clamped to the roof by a cover plate which is secured to the locking member by fastening means such as a single threaded fastener. The resultant structure is relatively inexpensive, easy to install and provides a durable and compact mounting structure for visors particularly important in modern-day vehicles in which the available space in the headliner and roof area is becoming increasingly smaller.

The structure embodying the present invention includes a visor rod having a locking member secured to the rod to provide a predetermined rotational torque between the rod and the locking member. The locking member includes tab means extending outwardly for engaging one side of the sheet metal roof of a vehicle when installed. The assembly also includes a cover plate extending over the visor rod and axially spaced from the locking member and including tab means engaging an opposite side of the roof. When the locking member is inserted in the sheet metal roof and rotated to an engaging position, the cover plate is secured thereto to compressibly clamp the assembly in position in the vehicle, thereby mounting the visor attached to the visor rod to the vehicle.

The many advantages, features and objects of the present invention can best be understood by reference to the following description thereof together with the accompanying drawings in which:

BRIEF DESCRIPTION OF THE DRAWINGS

FIG. 1 is a fragmentary, exploded view of a visor mounting assembly embodying the present invention;

FIG. 2 is a top plan view of the cover plate illustrated in FIG. 1;

FIG. 3 is a cross-sectional view of the cover plate taken along section line III—III of FIG. 2;

FIG. 4 is a cross-sectional view of the cover plate taken along section line IV—IV of FIG. 2;

FIG. 5 is a top plan view of the locking member shown in FIG. 1;

DETAILED DESCRIPTION OF THE PREFERRED EMBODIMENT

Figure 6:
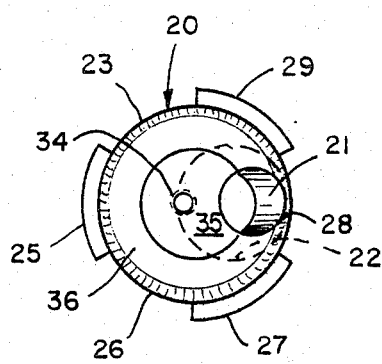
FIG. 6 is a bottom plan view of the locking member shown in FIG. 1.

Referring initially to FIG. 1, there is shown a visor assembly 10 embodying the present invention which includes a visor 12 having a visor pivot rod 14 extending from one end thereof for securing the body of the visor to the vehicle by the novel mounting structure of the present invention. The visor 12 and the mounting structure for rod 14 within the body of the visor can be substantially the same as disclosed in U.S. Pat. No. 4,352,518, the disclosure of which is incorporated herein by reference. Visor rod 14 includes an elbow 15 with an upper extending end 16 on which there is integrally molded a polymeric locking member 20, shown in detail in FIGS. 5–7.

The mounting assembly 60 of one embodiment of the present invention includes locking member 20 and a cover plate 40 with the locking member 20 extending through a bayonet socket 39 of the sheet metal roof member 30 of a vehicle. The locking member engages the upper surface 31 of roof member 30 with the cover plate 40 compressibly engaging the lower surface 32 of roof member 30 with fastening means such as screw 62 securing elements 20 and 40 in compressible engagement against the roof member 30, thereby mounting the visor assembly 10 to a vehicle.

Figure 8:
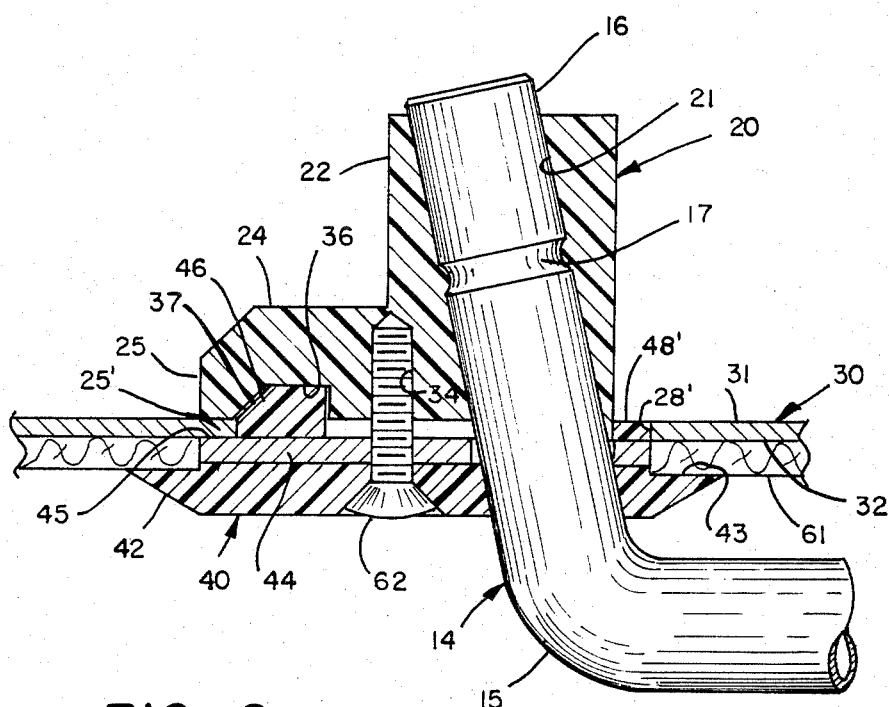
FIG. 8 is an enlarged assembly view in cross section of the structure shown in FIG. 1.

Member 20 is molded on end 16 of rod 14 and held in axial alignment by a roll-formed annular depression 17 extending around the rod and into which the polymeric material forming member 20 extends, as best seen in FIG. 8. Member 20 is molded of an acetal homopolymer such as DELRIN ®500DK602 to provide the desired characteristics for this application. Other polymeric materials, however, having a shrinkage of from about 0.020 to 0.025 inches per linear inch to compressibly engage the cylindrical rod 14 and which upon cooling will not set up against the rod, thereby providing the desired break-away torque, could also be employed. The desired property of such material is set forth in detail in Modern Plastics Encyclopedia, McGraw-Hill, New York, Volume 54, No. 10A, 1977–1978, on page 8.

Figure 7:
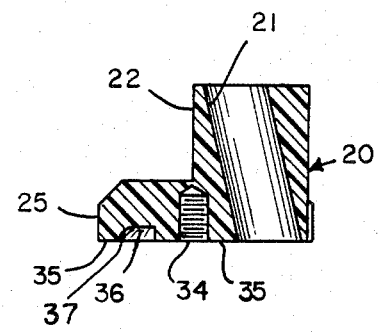
FIG. 7 is a cross-sectional view of the locking member shown in FIG. 1 taken along section line VII—VII of FIG. 5.

The integrally molded locking member 20 includes an upper cylindrical section 22 and a lower, enlarged diameter cylindrical section 24 with a common aperture 21 extending downwardly therethrough, canted at an angle to align the visor 12 in a generally horizontal plane when installed in a vehicle. In a preferred embodiment of the invention, the vertical height of section 22 was approximately 0.60 of an inch while the height of section 24 was approximately 0.38 inches to provide sufficient strength for holding the visor assembly securely in place once installed. The lower cylindrical section 24 includes three, equally spaced tab means 25, 27 and 29 each being of generally annular segments circumscribing an arc of approximately 61 degrees with slots 23, 26 and 28 therebetween circumscribing an arc of approximately 59 degrees between the tab means so formed. As best seen in FIGS. 7 and 8, the lower section 24 includes a threaded aperture 34 for receiving fastening means such as screw 62. The lower surface 35 of member 20 includes an upwardly extending annular recess 36 (FIGS. 6 and 8) for cooperatively receiving an annular shoulder 46 of cover plate 40, as described in greater detail below. Recess 36 has a beveled outer edge 37, beveled at the same angle as shoulder 46 of the cover plate 40 for matingly receiving the cover plate when the assembly is installed in a vehicle.

The lower surface of each of the tab means 25, 27 and 29 are substantially flat to engage inwardly projecting annular segment tab means 25', 27' and 29' defining in part the bayonet aperture 39 of roof member 30. Extending between apertures 25', 27' and 29', are segmented annular slots 23', 26' and 28' circumscribing an arc of approximately 61 degrees to permit tab means 25, 27 and 29 to extend through slots 23', 26' and 28' for insertion of the tabs of locking member 20 through the aperture 39 and when rotated approximately 60 degrees, position locking member 20 with tabs 25, 27 and 29 aligned above tabs 25', 27' and 29'.

As can be seen by reference to FIG. 8, the lower surface 35 of locking member 20 engages the top surface 31 of the sheet metal roof member 30 while the cover plate 40 has segmented annular contact surfaces 45 which compressibly engage the under surface 32 of the sheet metal roof member 30 in alignment with tabs 25, 27 and 29 of the locking member.

The cover plate 40 is generally disk-shaped having a lower circular face 41 beveled around its periphery 42 to provide a neat, trim appearance when installed in a vehicle. An annular flange 43 on the opposite surface of the beveled portion 42 (FIGS. 2, 3 and 8) is spaced from the under surface 32 of sheet metal roof member 30 a distance to permit insertion of the upholstery material 61 thereunder to provide a trim appearance when installed. Integrally molded to an upstanding central portion of plate 40 is a metal disk 44 which includes a plurality of apertures 50 formed therethrough for permitting cover plate 40 to be integrally molded with an annular shoulder section 46 above washer 44 but integrally and mechanically coupled to lower portion 41. Shoulder 46 includes a beveled edge 47 which mates with the outer peripheral beveled edge of recess 36, as illustrated in FIG. 8. Shoulder 46 also includes three segmented annular tab means 43', 46' and 48' which circumscribe an arc of approximately 60 degrees and indexibly inserts the cover plate 40 with the tabs fitted within corresponding apertures 23', 26' and 28' of the bayonet aperture 39 of the roof member 30 such that tab members 25', 27' and 29' of the sheet metal roof fit into the annular slots 45', 47' and 49' (FIG. 1) of the cover plate with cover plate tabs 43', 46' and 48' indexibly locking the cover plate in position against rotation with respect to the sheet metal roof member 30. Thus, the arcuate, segmented, exposed surfaces 45 of washer 44 (as best seen in FIGS. 1 and 2) of the cover plate are seated directly under the inwardly projecting annular segments 25', 27' and 29' of the roof which are compressibly engaged by the tab means 25, 27 and 29 of locking member 20 upon installation. The cover plate includes an angularly offset aperture 48 which aligns with aperture 21 of the locking member to receive rod end 16.

Cover plate 40 is installed on the visor rod 14 subsequent to the molding of locking member 20 thereon and prior to the insertion of the visor rod into the visor body 12. The cover plate 40 also includes an aperture 49 for receiving the fastening screw 62, as illustrated in FIG. 8, such that the cover plate 40 can be moved axially in a direction toward locking member 20 during installation with shoulder 46 extending into recess 36. Installation is achieved by initially loosely fitting fastening means 62 in place to hold the cover plate 40 in a general position, inserting the visor rod and integrally molded locking member thereon through the bayonet socket formed in the sheet metal roof member and rotating it approximately 60 degrees to position tab means 25, 27 and 29 over lands 25', 27' and 29' of the sheet metal roof member. The cover plate is then tightened which raises tabs 43', 46' and 48' into slots 23', 26' and 28' of the sheet metal roof member thereby locking the cover plate against rotation with respect to the vehicle and simultaneously compressing the tabs 25, 27 and 29 between lands 25', 27' and 29' and clamping annular segmented clamping surfaces 45 of the cover plate to ridgedly hold the assembly within the roof of the vehicle.

Figure 9:
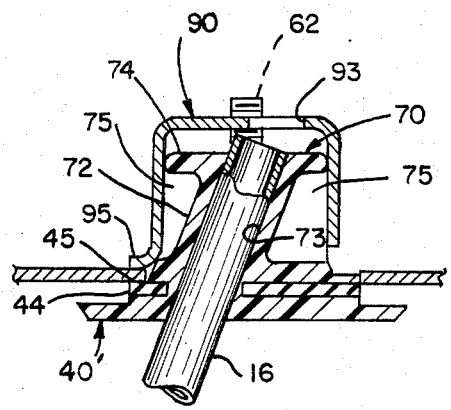
FIG. 9 is a fragmentary assembly view in cross section of an alternative embodiment of the present invention.
Figure 12:
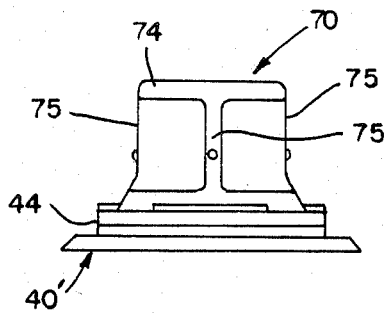
FIG. 12 is a side elevational view of a portion of the structure shown in FIG. 9.

An alternative embodiment of the present invention is illustrated in FIGS. 9 through 12 in which the locking member 20 and cover plate 40, illustrated in the first embodiment, is replaced with an integral torque member 70. A cup-shaped backing plate 90 is provided with tab means corresponding to the tab means associated with locking member 20 to achieve the same results. In the embodiment shown in FIGS. 9 through 12, the torque member integrally includes molded thereon a cover plate assembly 40' with the same lower tab and slot elements as that described in connection with FIGS. 1 and 2 through 4. Member 90 is integrally molded to include the backing plate 44 of the same construction as that described in the previous embodiment. Extending centrally upwardly is a trunk 72 having an aperture 73 formed therein at an inclined angle for receiving the pivot rod end 16 for horizontally positioning the visor body when assembled and installed in a vehicle. Trunk 72 terminates at the upper end with a circular flange 74 for centering thereover the cup-shaped backing member 90 in alignment over the cover plate portion 40'. As seen in FIGS. 9 and 12, the cylindrical flange 74 is supported by four orthogonally oriented and vertically extending wall sections 75 which also support the inner sidewall of backing member 90. As with locking member 20, the torque member 70 is integrally molded on the visor rod end 14 and is made of the same material as locking member 20.

An aperture (not shown) is formed through the integral cover plate, plate 44, and central trunk 72 and extends vertically therethrough for receiving a fastening screw 62 which extends upwardly through the torque member and is threadably received in a threaded aperture 91 of backing member 90. Backing member 90 also includes an aperture 93 aligned with aperture 73 such that an electrical conduit can be extended through the hollow visor rod 14 and through the backing member and connect to the vehicle's electrical system when visor 12 is of the illuminated mirror type.

Figure 10:
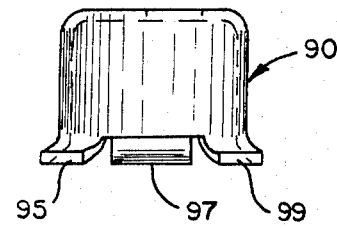
FIG. 10 is a side elevational view of a portion of the structure shown in FIG. 9.
Figure 11:
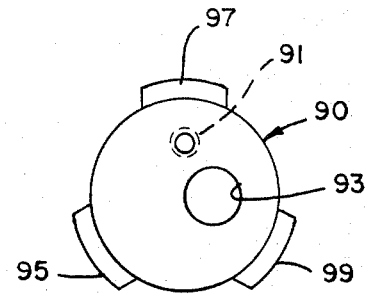
FIG. 11 is a top plan view of the structure shown in FIG. 10.

The backing member 90 is shown in greater detail in FIGS. 10 and 11 and is made of steel including three circumferentially spaced, segmented annular flanges 95, 97 and 99 corresponding in shape and function to flanges 25, 27 and 29 of locking member 20, shown in FIG. 1. The flanges define segmented arcuate contact surfaces at their lower surfaces for engaging the upper surface of tabs 25', 27' and 29' of the sheet metal roof member 30, as shown in FIG. 1, when the structure is assembled.

For assembly, the clamping means such as screw 62 is loosely fitted within the threaded aperture 91 of backing member 90, and the assembly inserted into the bayonet socket 39 of the sheet metal roof member of the vehicle and rotated approximately 60 degrees to align tabs 95, 97 and 99 with corresponding inwardly projecting annular flange sections 25', 27' and 29' of the sheet metal roof member placing the top segmented annular exposed surface areas 45 of backing washer 44 against the lower surface of the roof member tabs. Screw 62 is then tightened to clamp the backing member downwardly against the upper surface of the roof member thereby clamping the assembly securely in position between the torque member and backing plate. As with the first embodiment, the mounting assembly holds the torque fitting stationary within the vehicle allowing the pivot rod to rotate therein for movement of the visor from the windshield to the side window.

It will become apparent to those skilled in the art that various modifications to the preferred embodiment of the invention can be made without departing from the spirit or scope of the present invention as defined by the appended claims.

The embodiments of the invention in which an exclusive property or privilege is claimed are defined as follows:

1. A visor mount for attaching a visor to a roof member of the body of a vehicle comprising:
   a visor rod extending from a visor;
   mounting means including a portion secured to said rod to provide a predetermined rotational torque between said rod and said mounting means permitting said rod to rotate with respect to said mounting means, said mounting means including tab means extending outwardly therefrom for insertion into slot means formed in the roof member of a vehicle and for engaging one side of the roof member when rotated after insertion, said mounting means further including surface means aligned with said tab means for engaging an opposite side of the roof member; and
   means for securing said mounting means to the roof member of a vehicle to compressibly clamp the roof member between said tab means and said surface means for securing a visor to the vehicle.

2. The apparatus as defined in claim 1 wherein said mounting means includes a locking member which is integrally molded on said visor rod to provide said predetermined rotational torque between said rod and said locking member, said locking member further integrally including said tab means, said mounting means also including a cover plate extending over said visor rod and including said surface means thereon which align with said tab means of said locking member.

3. The apparatus as defined in claim 2 wherein said cover plate includes means engaging the slot means formed in the roof member of a vehicle for lockably indexing said cover plate against rotation.

4. The apparatus as defined in claim 3 wherein said tab means of said locking member comprises spaced annular segments extending radially outwardly from said locking member.

5. The apparatus as defined in claim 4 wherein said surface means of said cover plate comprises spaced annular segments formed in a side of said cover plate facing said locking means.

6. The apparatus as defined in claim 5 wherein said engaging means comprises annular land segments extending circumferentially between said annular segments.

7. The apparatus as defined in claim 6 wherein said locking member is molded of a polymeric material.

8. The apparatus as defined in claim 7 wherein said cover plate includes a metal disk defining said surface means and further including a polymeric material molded onto said disk and defining said annular land segments.

9. The apparatus as defined in claim 1 wherein said mounting means includes a torque member integrally molded on said rod to provide said predetermined rotational torque between said rod and said torque member and a cup-shaped backing member positioned over said torque member and integrally including said tab means thereon and wherein said means for securing said mounting means to the roof member of a vehicle comprises a threaded aperture formed in said backing member and fastening means extending through said torque member to engage said backing member.

10. The apparatus as defined in claim 9 wherein said torque member integrally includes said surface means.

11. The apparatus as defined in claim 10 wherein said surface means are spaced annular segments extending between spaced annular lands formed on said torque member.

12. The apparatus as defined in claim 11 wherein said torque member includes means at an upper end extending into said cup-shaped backing member for centering said backing plate.

13. The apparatus as defined in claim 12 wherein said tab means comprises spaced annular segments extending radially outwardly from said backing member.

14. The apparatus as defined in claim 13 wherein said torque member is made of a polymeric material.

15. The apparatus as defined in claim 14 wherein said torque member includes a metal disk integrally molded therein and exposed to define said spaced annular segments.

16. A visor mount for attaching a visor to a roof member of the body of a vehicle comprising:
   a visor rod extending from a visor;
   a locking member secured to said rod to provide a predetermined rotational torque between said rod and said locking member permitting said rod to rotate with respect to said locking member, said locking member including tab means extending outwardly therefrom for insertion into slot means formed in the roof member of a vehicle and for engaging one side of the roof member when rotated after insertion;
   a cover plate extending over said visor rod and including surface means aligned with said tab means of said locking member for engaging an opposite side of the roof member; and means for securing said cover plate to said locking member to clamp the roof member therebetween for securing a visor to the vehicle.

17. The apparatus as defined in claim 16 wherein said cover plate includes tab means extending into the slot means for preventing rotation of said cover plate.

18. The apparatus as defined in claim 17 wherein said locking member is a polymeric material molded onto said visor rod.

19. The apparatus as defined in claim 18 wherein said locking member has a generally cylindrical body.

20. The apparatus as defined in claim 19 wherein said locking member tab means comprises three equally spaced tabs extending radially outwardly from said body.

21. The apparatus as defined in claim 20 wherein said surface means of said cover plate is segmented arcuate surfaces axially spaced from said tab means of said cover plate in a radial direction away from said locking member.

22. The apparatus as defined in claim 6 wherein said locking member includes a threaded aperture and said cover plate has an aperture extending therethrough and aligned with said threaded aperture and wherein said securing means includes a threaded fastener extending through said aperture in said cover plate and threadably into said threaded aperture of said locking member.

23. A bayonet mount for attaching a visor to the roof member of a vehicle in which a bayonet socket is formed comprising:

a bayonet locking torque member secured to a visor rod for providing a predetermined rotational torque between the visor rod and said member, said locking torque member insertable into the socket and including tab means for engaging one side of the roof member adjacent the socket for holding a visor positioned on the rod in place upon subsequent rotation of said locking member;

a backing member positioned on the visor rod adjacent and spaced from said locking torque member to engage a side of the roof member opposite said locking torque member; and means for securing said backing member to said locking torque member to compressibly hold the roof member therebetween.

\* \* \* \* \*